(12) United States Patent
O'Brien et al.

(10) Patent No.: US 7,931,322 B2
(45) Date of Patent: Apr. 26, 2011

(54) CONSOLE

(75) Inventors: Timothy F. O'Brien, White Lake, MI (US); Daniel V. Beckley, Byron, MI (US); Lisa Ann Grems, West Bloomfield, MI (US); Russell P. Shafer, Jr., Howell, MI (US)

(73) Assignee: Intier Automotive Inc., Newmarket (CA)

( * ) Notice: Subject to any disclaimer, the term of this patent is extended or adjusted under 35 U.S.C. 154(b) by 233 days.

(21) Appl. No.: 12/280,198

(22) PCT Filed: Feb. 20, 2007

(86) PCT No.: PCT/CA2007/000256
§ 371 (c)(1), (2), (4) Date: Nov. 18, 2008

(87) PCT Pub. No.: WO2007/095731
PCT Pub. Date: Aug. 30, 2007

(65) Prior Publication Data
US 2009/0224564 A1    Sep. 10, 2009

(51) Int. Cl.
*B60R 13/00* (2006.01)
(52) U.S. Cl. ............... 296/24.34; 296/37.8; 224/275
(58) Field of Classification Search .......... 220/212, 220/817, 818, 819, 826, 840; 224/275, 486, 224/539; 296/37.8, 24.34
See application file for complete search history.

(56) References Cited

U.S. PATENT DOCUMENTS

| 6,279,977 | B1 | 8/2001 | Chen |
| 6,644,526 | B2 | 11/2003 | Pegorier |

FOREIGN PATENT DOCUMENTS

| JP | 04208655 A | 7/1992 |
| JP | 05338498 A | 12/1993 |
| JP | 07009915 A | 1/1995 |
| JP | 09202168 A | 8/1997 |
| JP | 2000153738 | 6/2000 |
| JP | 2003165388 A | 6/2003 |
| JP | 2005145384 A | 6/2005 |
| WO | WO 02/00458 | 1/2002 |

*Primary Examiner* — Lori L Lyjak
(74) *Attorney, Agent, or Firm* — Honigman Miller Schwartz and Cohn LLP

(57) ABSTRACT

An automotive console is provided including an accessory receiving body or bodies generally located proximate one or more base portions positioned over or secured to a body, such as, for example, a floor pan/panel of an automobile. The accessory receiving body or bodies may each include a closure panel or the like and an actuator operably associated therewith. The actuator may be a switch, such as an electronic contact, arranged in a predetermined position, such that a portion of the closure panel operably contacts the actuator to deploy an accessory, such as a beverage container or the like. Further, it will be appreciated that upon movement of the closure panel away from the actuator, the actuator will be adapted to stow the accessory.

31 Claims, 18 Drawing Sheets

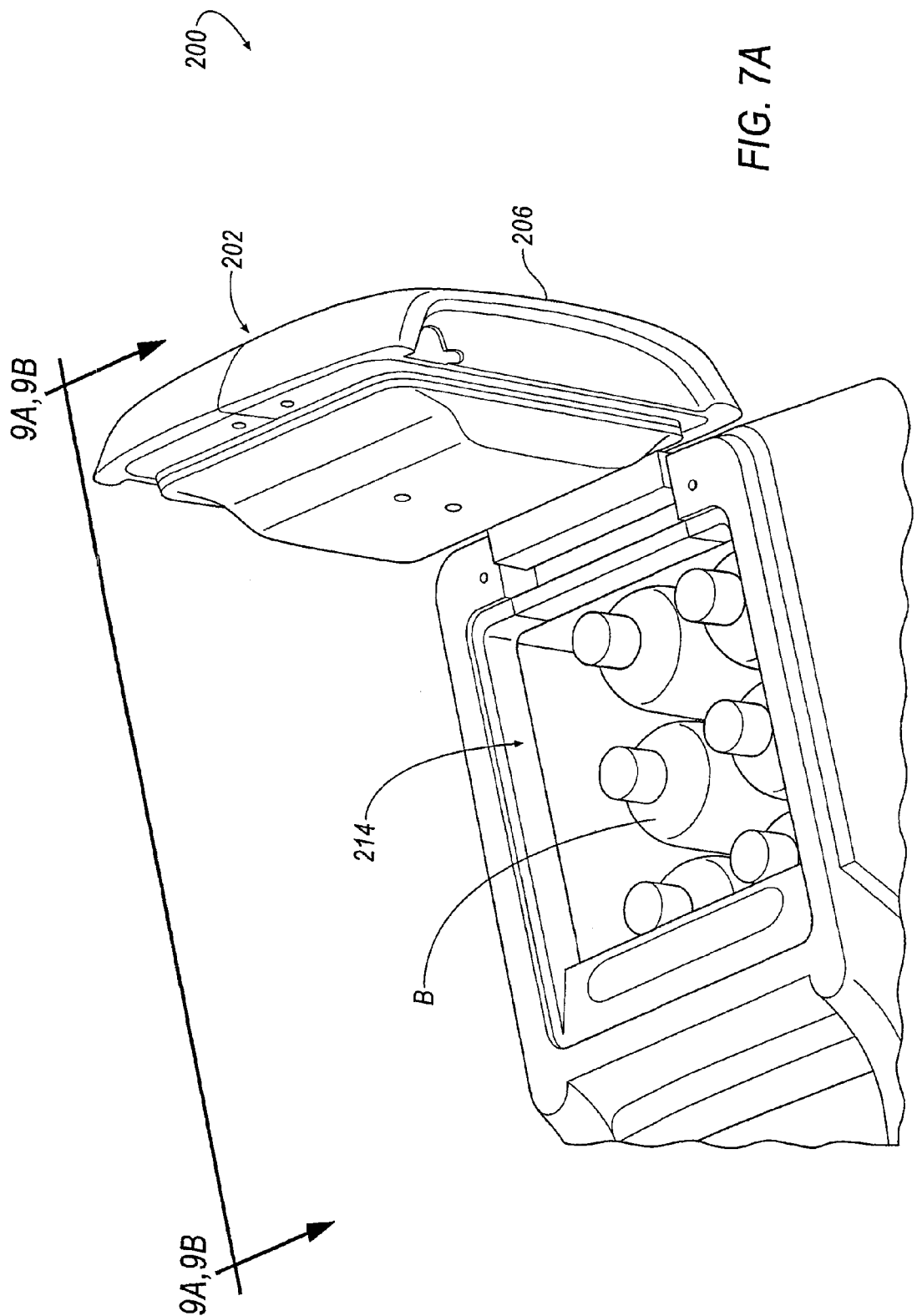

CONSOLE

FIELD OF THE INVENTION

The present invention generally relates to the field of automotive interiors, and more particularly to an automotive console having an accessory receiving body.

BACKGROUND OF THE INVENTION

It is known that automotive interiors include accessory receiving bodies, such as, storage compartments and the like. However, conventional accessory receiving bodies are usually limited in accessibility and not relatively ergonomic for the needs of all types of users, and/or more than one user, relative the location of many potential users proximate the accessory receiving body. Therefore, a need exists for improved accessory receiving bodies that are ergonomic and increase user accessibility, storage capacity, or the like.

SUMMARY OF THE INVENTION

An object of the present invention is to overcome the problems delineated hereinabove.

In accordance with the invention there is provided, a console for a vehicle comprising a closure panel and an actuator operably connected to the closure panel, whereupon engagement between the closure panel with the actuator instructs a vehicle accessory to move from a first position to at least one second position.

In accordance with a further embodiment of the invention, the console further comprises a motor connected to the actuator, and a lifting mechanism connected to the motor and the vehicle accessory, wherein movement of the lifting mechanism is responsive to the actuation of the motor, wherein the actuator is a contact sensor that causes the motor to drive the lifting mechanism to cause movement of the vehicle accessory from the first position to the at least one second position.

In accordance with another aspect of the invention, the lifting mechanism is defined by a scissor bridge and a ball screw. In accordance with yet another aspect of the invention, the lifting mechanism is defined by a ball screw, a bearing, and a stability post.

In accordance with another embodiment of the invention, the console further comprises a body defined by a floor and sidewalls extending axially from said floor, wherein said sidewalls are fixed relative to said floor, wherein the vehicle accessory defines a receiving body that is movably-disposed in the body for movement between said first and second positions and any position therebetween within the body, said receiving body accessible independent of said position thereof within the body.

In accordance with another aspect of the invention, the receiving body further comprises a sidewall defining a depth (D); and one or more partitioning elements defining two or more stowage segments.

In accordance with yet another aspect of the invention, the vehicle accessory further comprises a heating/cooling device and one or more beverage container receiving portions in thermal communication with the heating/cooling device.

In accordance with the invention, there is further provided a console for a vehicle comprising an accessory receiving body adjustable between a first position, a second position, and any position therebetween, said accessory receiving body accessible independent of said position thereof.

In accordance with another aspect of the invention, the console further comprises an actuator for causing movement of the accessory receiving body between said first position, second position, and any position therebetween, a motor connected to the actuator, and a lifting mechanism connected to the motor and the accessory receiving body, wherein movement of the lifting mechanism is responsive to the actuation of the motor.

In accordance with an embodiment of the invention, the actuator is a presence/weight sensor that detects the presence or weight of an object (P).

In accordance with another aspect of the invention, the console further comprises a closure panel, wherein the actuator is operably connected to the closure panel, whereupon engagement between the closure panel with the actuator instructs the accessory receiving body to move from the first position to the second position, and any position therebetween.

In accordance with another embodiment of the invention, the actuator is a contact sensor that causes the motor to drive the lifting mechanism to cause movement of the accessory receiving body from the first position to the second position, and any position therebetween.

In accordance with a further embodiment of the invention, the lifting mechanism is defined by a scissor bridge and a ball screw.

In accordance with yet a further embodiment of the invention, the lifting mechanism is defined by a ball screw, a bearing, and a stability post.

In accordance with a further aspect of the invention, the console further comprises a body defined by a floor and sidewalls extending axially from said floor, wherein the sidewalls are fixed relative to the floor, wherein the accessory receiving body is movably-disposed in the body, wherein the accessory receiving body is adjustable between the first position to the second position, and any position therebetween within the body. The accessory receiving body is accessible independent of said position thereof within the body.

In accordance with a further embodiment of the invention, the accessory receiving body further comprises a sidewall defining a depth (D) and one or more partitioning elements defining two or more stowage segments.

In accordance with yet a further embodiment of the invention, the accessory receiving body further comprises a heating/cooling device and one or more beverage container receiving portions in thermal communication with the heating/cooling device.

Furthermore, in accordance with the invention, there is provided a console for a vehicle comprising a body defining an interior space and first and second openings to provide access into said interior space, a first panel for providing selective access to said interior space via said first opening, and a second panel for providing selective access to said interior space via said second opening.

In accordance with another embodiment of the invention, the first panel and the first opening are positioned at a top of the body, and wherein the second panel and the second opening are positioned on a side of the body, and further wherein the second panel includes a control system interface.

In accordance with yet another embodiment of the invention, the interior space is a stowage cavity, and wherein the first opening provides access to the stowage cavity by moving the first panel from a closed position to an open position, and further wherein the second opening provides access to the stowage cavity by moving the second panel from a closed position to an open position, and wherein the first panel defines a cushioned surface and one side thereof to provide an armrest when the first panel is moved to the closed position, wherein, when the first panel is moved from the closed position to the open position, access to the stowage cavity through the first opening is provided to front seat passengers (F), wherein movement of the second panel from the closed position to the open position provides access to the stowage cavity through the second opening for rear seat passengers (R).

Furthermore, in accordance with another embodiment of the invention, the stowage cavity further comprises a tray for receiving one or more beverage containers (B), a temperature sensor, and a heating/cooling system connected to the temperature sensor for adjusting the temperature of the stowage cavity.

In accordance with a further aspect of the invention, the console further comprises an actuator for causing movement of the body between a first position, a second position, and any position therebetween, a motor connected to the actuator, and a lifting mechanism connected to the motor and the body, wherein movement of the lifting mechanism is responsive to the actuation of the motor. The actuator is a presence/weight sensor that detects the presence or weight of an object (P).

In accordance with another aspect of the invention, one of the first or second panels is operably connected to the actuator, whereupon engagement between one of the first or second panels with the actuator instructs the body to move from a first position to at least one second position. The actuator is a contact sensor that causes the motor to drive the lifting mechanism to cause movement of the body from the first position to the second position, and any position therebetween.

In accordance with yet another aspect of the invention, the console further comprises an outer body defined by a floor and sidewalls extending axially from said floor, wherein the sidewalls are fixed relative to the floor, and wherein the body is movably-disposed in the outer body. The body is adjustable between the first position to the second position, and any position therebetween within the outer body. The body is accessible independent of the position thereof within the outer body.

The body further comprises a sidewall defining a depth (D) and one or more partitioning elements defining two or more stowage segments.

Furthermore, in accordance with the invention, there is provided a console for a vehicle having a floor The console comprises a body defined by a floor and sidewalls extending axially from said floor, wherein said sidewalls are fixed relative to said floor, and an accessory receiving body disposed in the body, wherein the accessory receiving body is adjustable between a first position, a second position, and any position therebetween within the body, said accessory receiving body is accessible independent of said position thereof within the body.

In accordance with a further aspect of the invention, the console further comprises an actuator for causing movement of the accessory receiving body between the first position, the second position, and any position therebetween, a motor connected to the actuator, and a lifting mechanism connected to the motor and the accessory receiving body, wherein movement of the lifting mechanism (108) is responsive to the actuation of the motor. One of the first or second panels is operably connected to the actuator, whereupon engagement between one of the first or second panels with the actuator instructs the accessory receiving body to move from a first position to at least one second position. The actuator is a contact sensor that causes the motor to drive the lifting mechanism to cause movement of the accessory receiving body from the first position to the at least one second position. The lifting mechanism is defined by a scissor bridge and a ball screw.

In accordance with a further aspect of the invention, the body further comprises a sidewall defining a depth (D) and one or more partitioning elements defining two or more stowage segments.

This and other objects of the invention can be more fully appreciated from the following detailed description of the preferred embodiments.

BRIEF DESCRIPTION OF THE DRAWINGS

Exemplary embodiments of the invention will now be described in conjunction with the following drawings wherein like numerals represent like elements, and wherein:

FIG. 7A is a top perspective view of the accessory receiving body of FIG. 6 according to an embodiment of the invention;

DETAILED DESCRIPTION OF THE PREFERRED EMBODIMENTS

Figure 1:
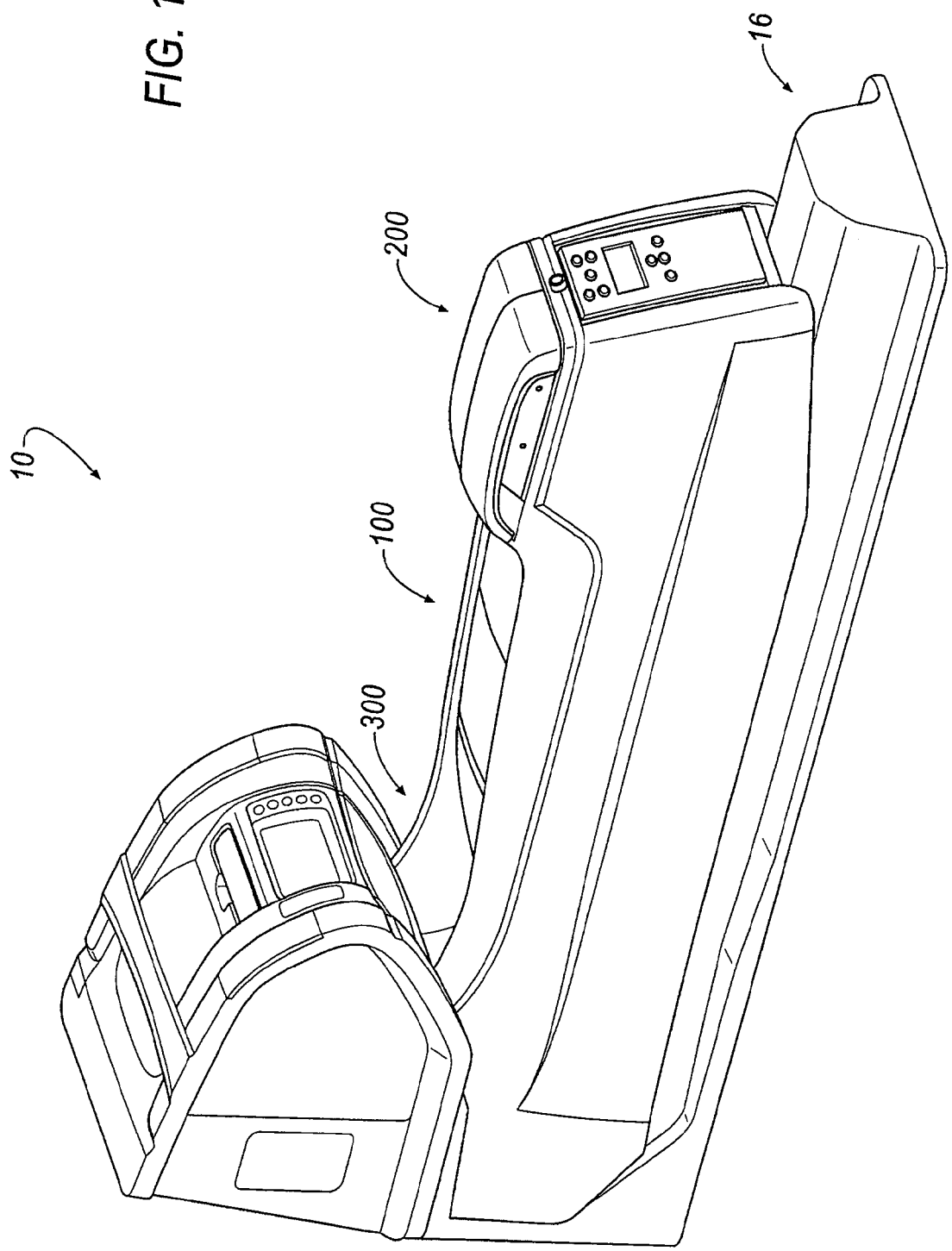
FIG. 1 is a perspective view of a console according to an embodiment of the invention.
Figure 2:
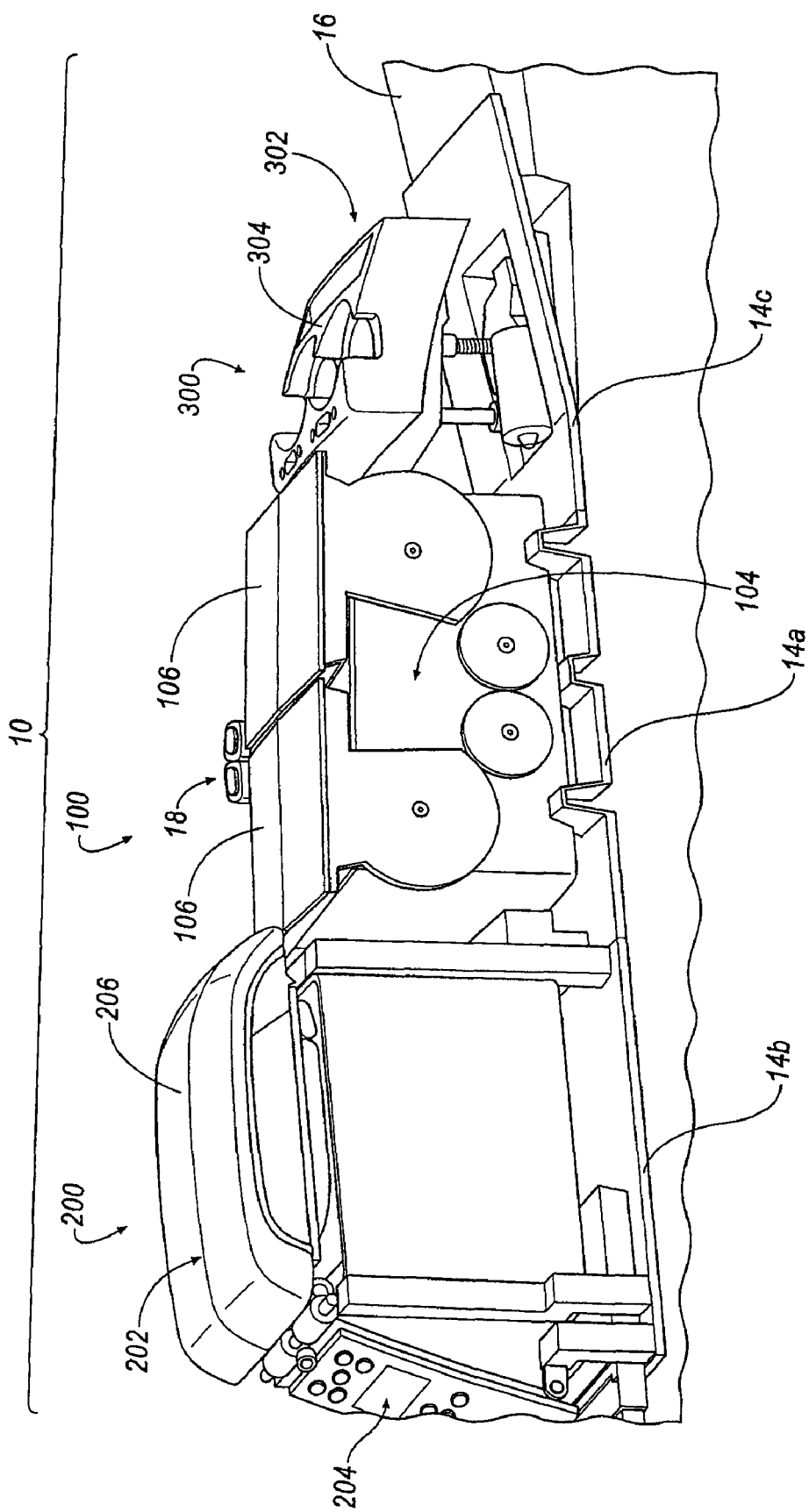
FIG. 2 is a partial perspective view of the console according to FIG. 1.

A console is shown generally at 10 in FIGS. 1 and 2 according to an embodiment of the invention. The illustrated console 10 includes accessory receiving bodies 100, 200, 300 that are generally located proximate one or more base portion (s) 14a-14c that are positioned over or secured to a body 16, such as, for example, a floor pan/panel of an automobile. Accordingly, the console 10 may be, if desired, a center floor console of an automotive interior.

Throughout this disclosure, the accessory receiving bodies 100, 200, and 300 may each include a closure panel or the like and a detector operably associated therewith. The detector may be a switch, such as an electronic contact, arranged in a predetermined position, such that a portion of closure panel operably contacts the detector to deploy an accessory, such as a beverage container or the like. Although specific configurations or embodiments of the foregoing closure panel and detector are described in detail herein, the present disclosure contemplates any format of a closure panel operably connected to the detector to deploy an accessory. Further, it will be appreciated that upon movement of the closure panel away from the detector, the detector will be adapted to stow the accessory.

Figure 3:
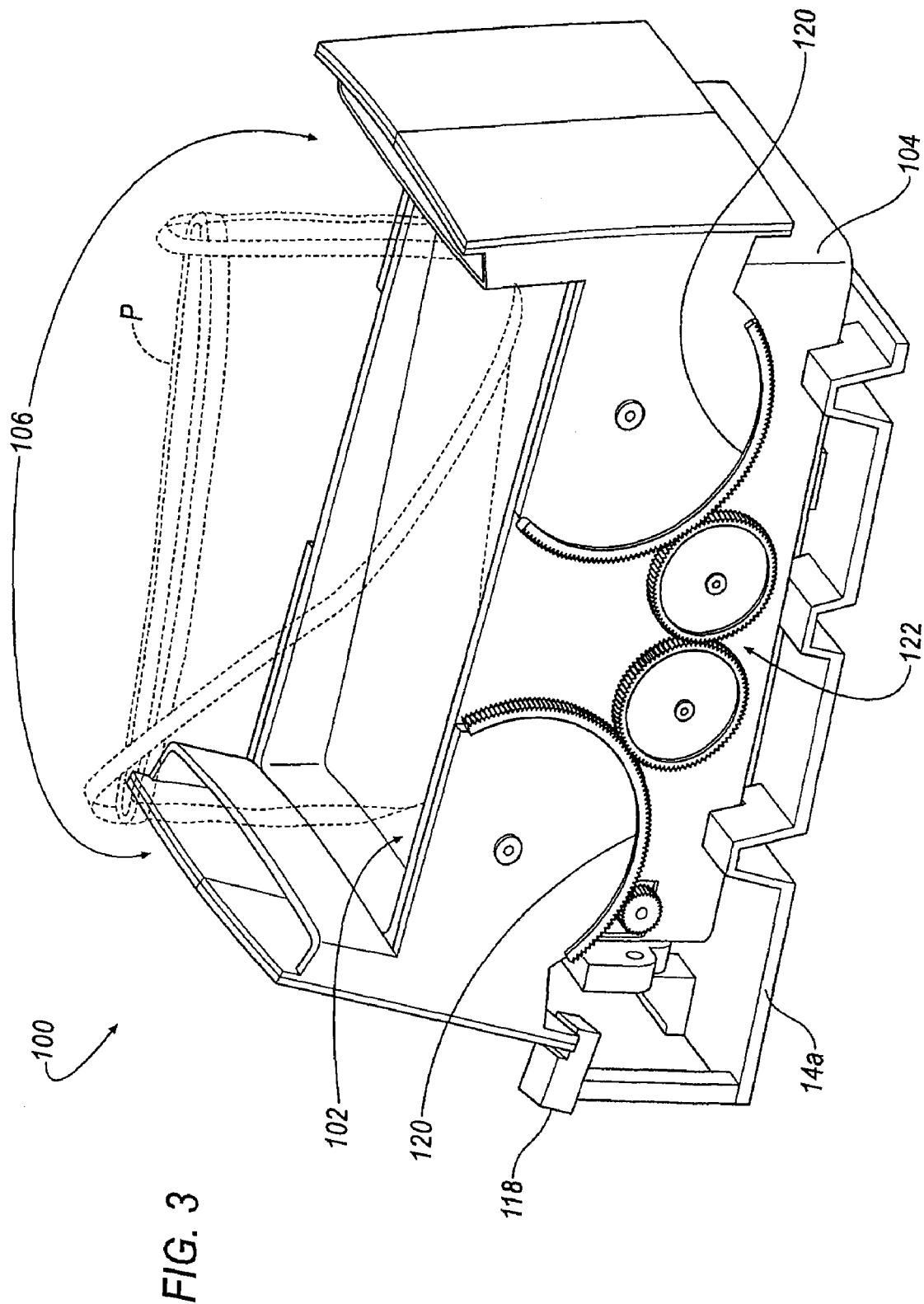
FIG. 3 is a perspective view of an accessory receiving body of the console of FIG. 1 according to an embodiment of the invention.
Figure 4A:
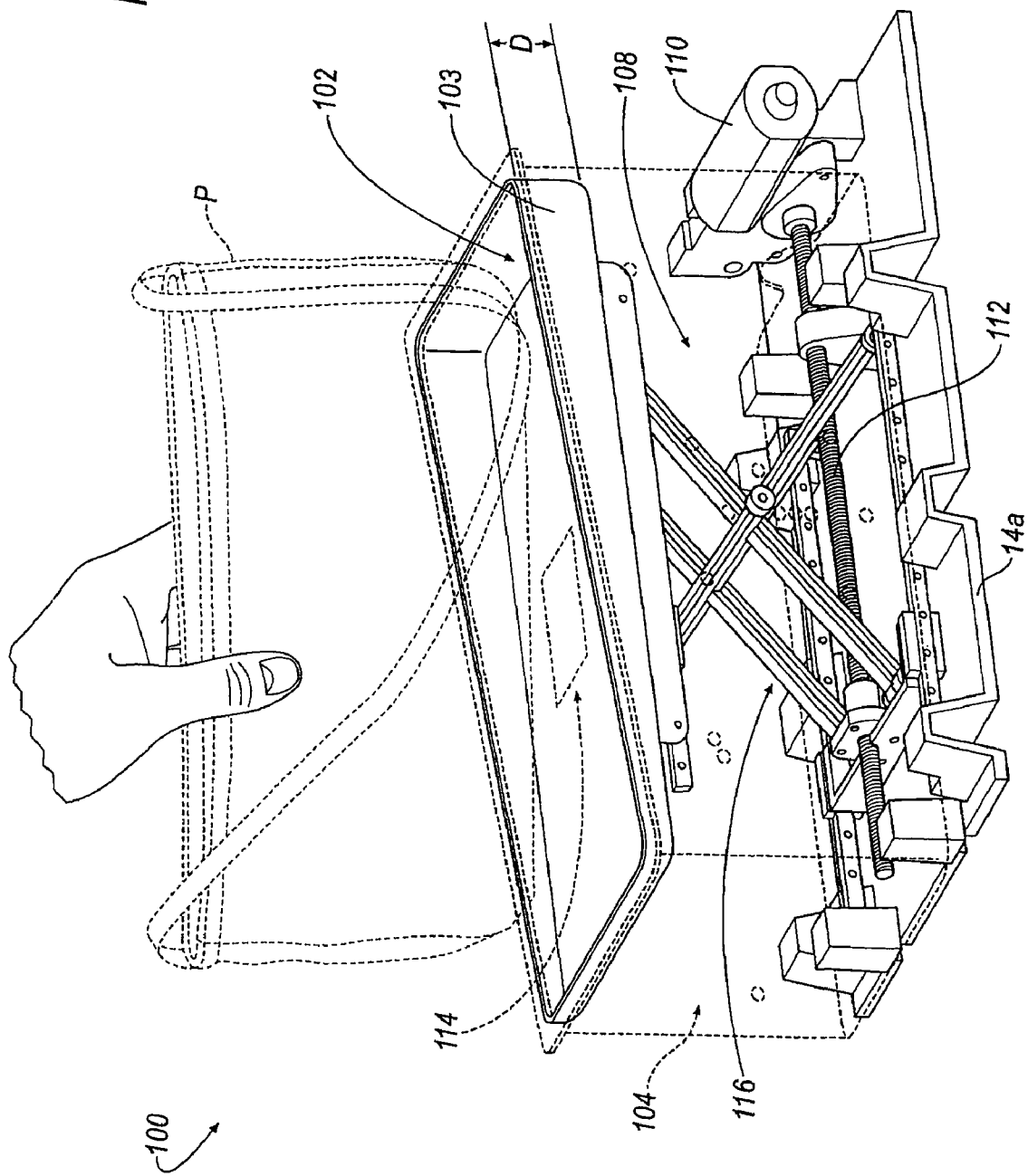
FIG. 4A is a perspective view of the accessory receiving body of FIG. 3 according to an embodiment of the invention.
Figure 4B:
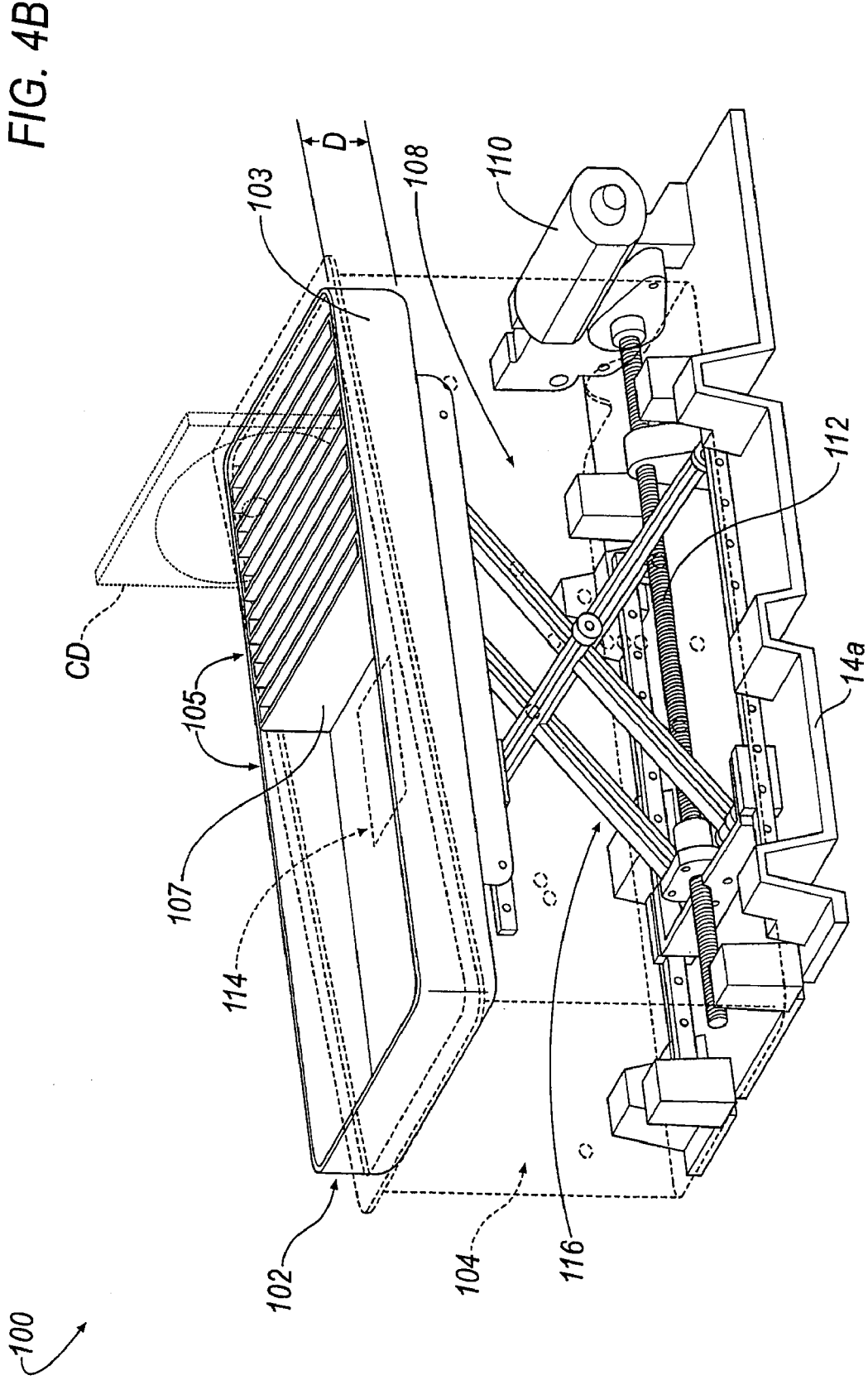
FIG. 4B is a perspective view of the accessory receiving body of FIG. 3 according to an embodiment of the invention.
Figure 4C:
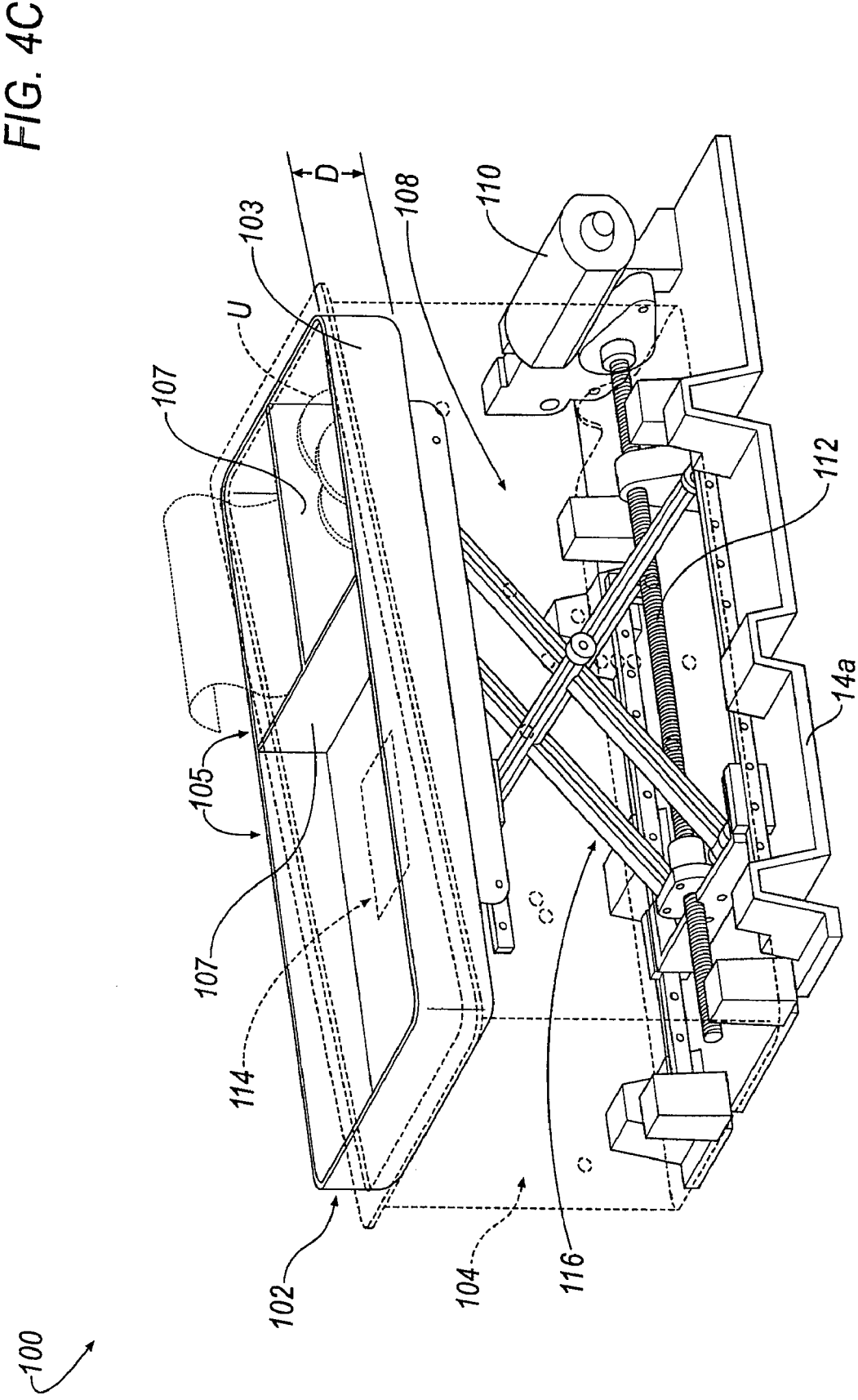
FIG. 4C is a perspective view of the accessory receiving body of FIG. 3 according to an embodiment of the invention.
Figure 5:
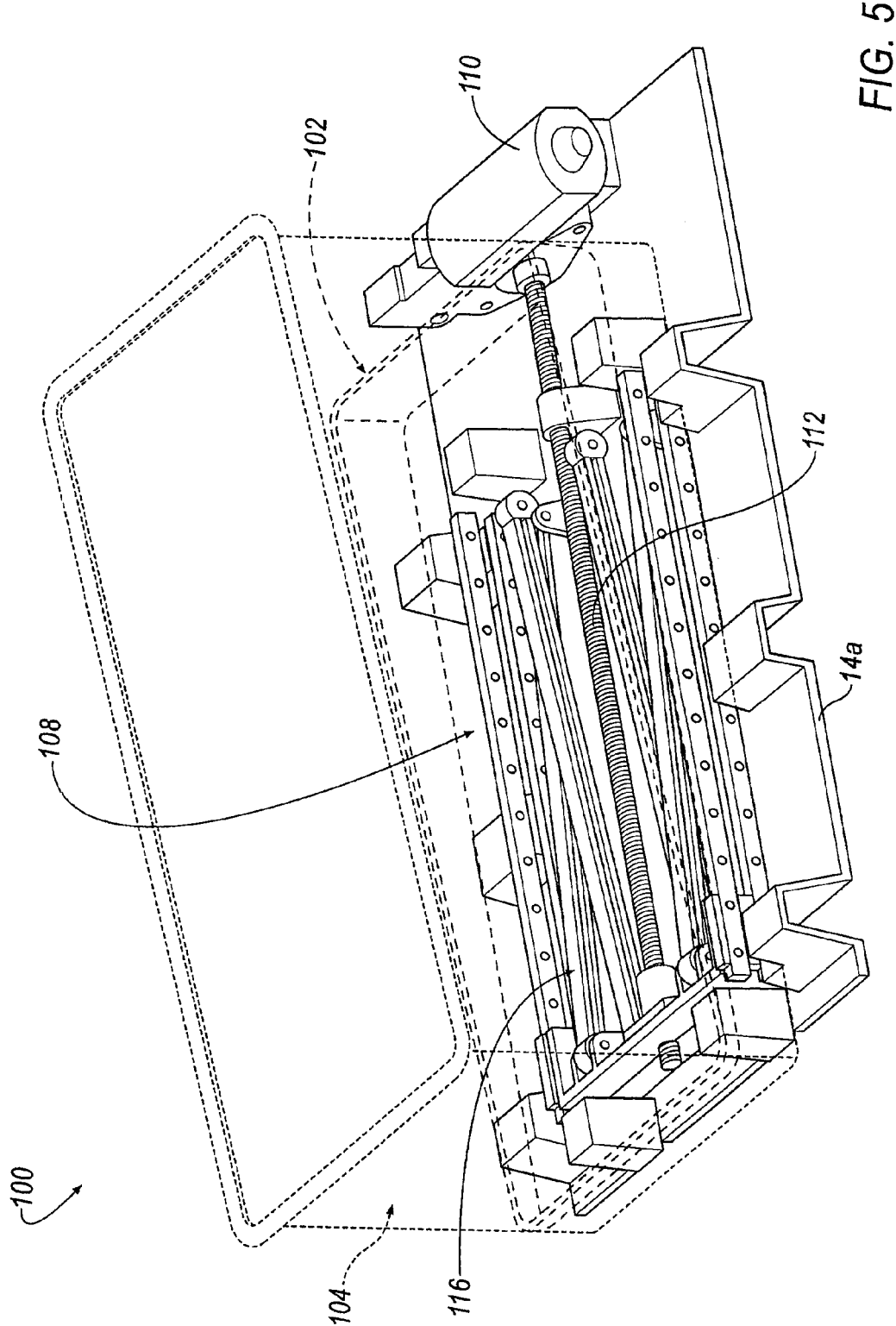
FIG. 5 is a perspective view of the accessory receiving body of FIG. 3 according to an embodiment of the invention.
Figure 6:
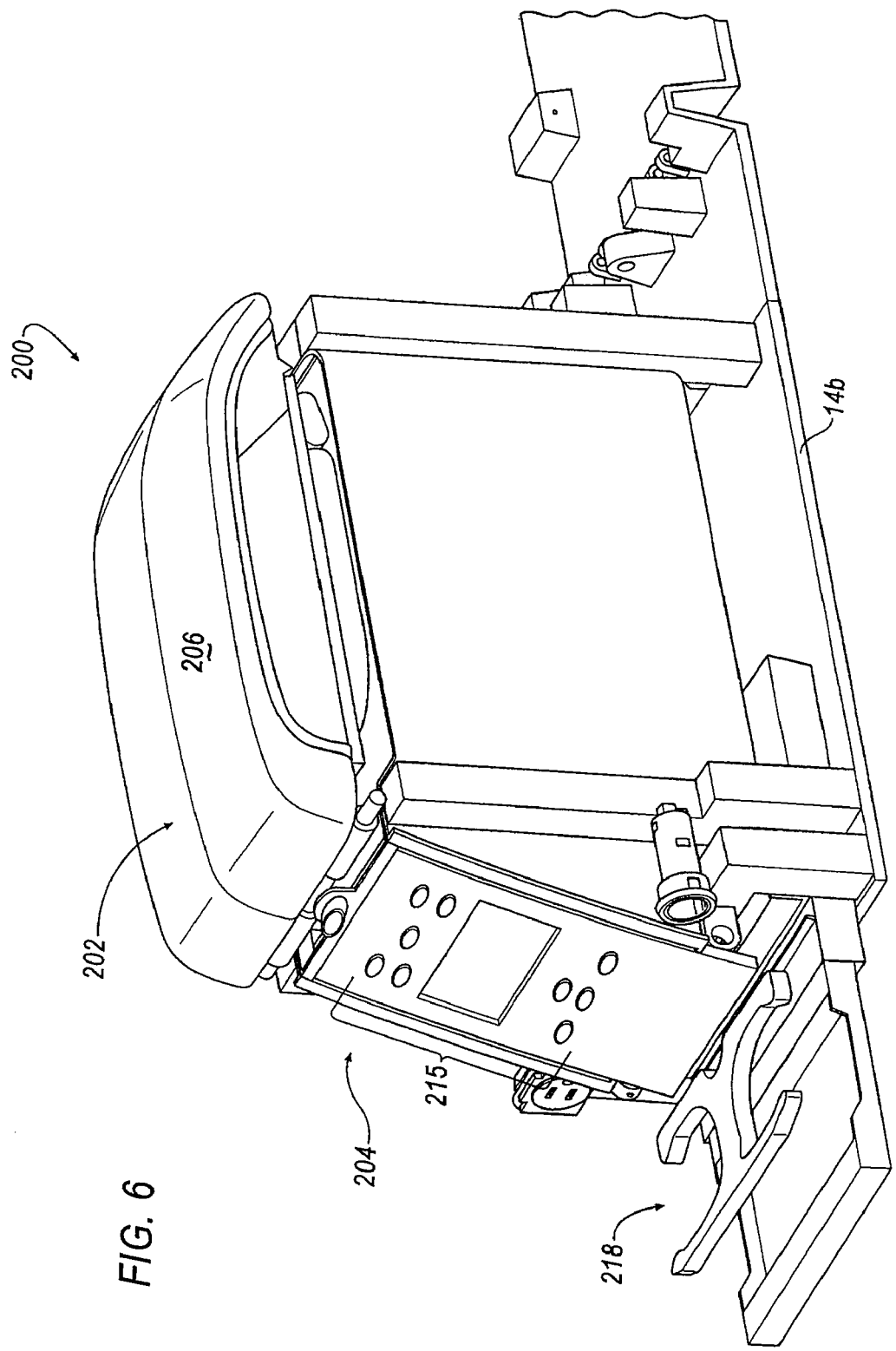
FIG. 6 is a perspective view of an accessory receiving body of the console of FIG. 1 according to an embodiment of the invention.

According to an embodiment, the accessory receiving body 100, which is generally shown in FIGS. 3-5, includes a bottom panel 102. According to an embodiment, the bottom panel 102 may be presented in the form of a tray or the like. The bottom panel 102 may be elevated or otherwise adjusted between a stowed position and a presentment position; further, in an exemplary embodiment, the bottom panel 102 may be positioned at any position between the stowed position and the presentation position. According to an embodiment, bottom panel 102 may be configured for stowing items in a housing 104 without impairing a user's reach to the item(s).

The accessory receiving body 200, which is shown generally in FIGS. 6-9B, includes a first access panel 202 and a second access panel 204. For convenience the first access panel 202 will be referred to as a top access panel 202 and the second access panel 204 will be referred to as a side access panel 204. However, it is appreciated that the access panels should not be limited to the disclosed embodiments, and the invention should not be limited thereby. The top access panel 202 and the side access panel 204 are adapted to allow access to the accessory receiving body 200 by one or more users from more than one access location.

The accessory receiving body 300, which is shown generally in FIGS. 10-14, is a vertically driven, adjustable beverage receptacle 300. The adjustable beverage receptacle 300 is adjustable between a first position and a second position and may be adjusted or configured to reside at any position therebetween. In other words, a base portion 302 may be presented at any of the foregoing positions such that the beverage receptacle 302 may be accessed and used at any each of these positions.

Referring to FIGS. 3-5, the accessory receiving body 100 includes a bottom panel 102, a housing 104, a closure panel 106 (FIG. 3), and a panel lift mechanism 108. According to an embodiment, the bottom panel 102 provides a means to elevate content that may reside within housing 104, on top of bottom panel 102. The bottom panel 102 is adapted to move from a first, stowed position to a second, presentment position, without elevating or otherwise moving the housing 104 such that the overall elevation of accessory receiving body 100 and closure panel 106 remain static, while elevation of the bottom panel 102 and any contents thereon is dynamic.

As illustrated, the closure panel 106 may be provided, for example, as a pair of "Bombay-style" doors and the lifting mechanism 108 may include, for example, a scissor-style bridge 116 and a ball screw 112 extending from a motor 110. While an electric motor 110 is shown, upon considering the present disclosure, it will be appreciated that the elevation of the bottom panel 102 may be adjusted using any prime mover, such as for example, a hydraulic mechanism, a pneumatic mechanism, or the like. Thus, the term "motor" should include all such prime moving mechanisms. Similarly, the closure panel 106 may be a single closure panel and thereby deviate from the aforementioned "Bombay-style" door, which will be appreciated by one of ordinary skill in the art after consulting the present disclosure such that the invention hereof should not be limited thereby.

As the foregoing description contemplates, according to an embodiment, a stowed or presentment position of the bottom panel 102 may be changed responsive to, for example, movement of the housing door 106 from an opened or closed position, or for example, by an actuating device, such as, for example, a switching means or the like.

In an embodiment, a detector such as an electrical contact 118 or the like may be provided such that the detector 118 detects the presence of the closure panel 106 in an open position (e.g., in a predetermined position, a portion of the closure panel 106 may contact the electrical contact 118) and operably elevates bottom panel 102. While an electrical contact is described, it is understood that other sensing means are also suitable. Among other examples, a photodiode or the like may be provided to detect the presence of a condition.

The detector 118 may also provide means lower the bottom panel to a stowed position when the of closure panel 106 moves away from the contact 118 or away from the predetermined position. Alternatively, an actuator 18 may be provided to actuate a stowing the bottom panel 102. Thus, upon an opening of the closure panel 106, the bottom panel 102 elevates to a presentment position and a purse or a like may be more easily placed thereon; and, upon a second condition, such as a closing of the closure panel 106, or upon any instruction (electrically or mechanically) provided thereto, the bottom panel 102 lowers to a stowed position.

As seen in FIGS. 4A-4C, the bottom panel 102 may be provided at any desirable depth, D. According to an embodiment, illustrated in FIG. 4A, the depth, D, of the bottom panel 102 may vary in view of the height of a side-wall 103. In FIGS. 4B and 4C, the side-wall 103 and depth, D, may be approximately the same about the perimeter of the bottom panel 102. As illustrated in FIGS. 4B and 4C, the bottom panel 102 may include a plurality of stowage segments 105 defined by partitioning elements 107 for stowing a plurality of items, such as, for example, compact disc cases, CD, writing utensils, U, papers, coins, crayons, and the like. It will be appreciated that the depth, D, prevents contents located in/on the bottom panel 102 from spilling out of the housing 104 as the tray 102 rises from a stowed position to a presentment position.

According to an embodiment, the motor 110 may cause rotation of a ball screw 112 to effect movement of the scissor-style bridge 116 to/from a stowed/presentment position. According to an embodiment, actuation of the motor 110 may manually occur in response to a user employing an actuator 18, which may be provided in the form of a switch or the like (FIG. 2). According to an embodiment, actuation of the motor 110 may automatically occur in response to a signal provided by a sensor 114 located proximate the bottom panel 102 for detecting the presence/weight of an item, such as a purse, P; as such, the sensor 114 may include, or, communicate with a controller (not shown) to signal activation of the motor 110. According to an embodiment, the lifting mechanism 108 may be initially in a presentment position (FIG. 3-4C), and, when the sensor 114 detects the presence/weight of an item, the tray 102 may be moved automatically to a stowed position (FIG. 5). If desired, in an alternative embodiment, the motor 110 may be eliminated and the lifting mechanism 108 may include a mechanically controlled device that elevates and lower the bottom panel based on a condition. For example, the condition may be the position or movement of the closure panel(s) or the like which could effect an elevation or lowering of the bottom panel via a linking mechanism (not shown.) If desired, the bottom panel 102 and/or lifting mechanism 108 may include a latch/lock (not shown) that retains the bottom panel 102 and lifting mechanism 108 in a stowed, deployed, or intermediate position (i.e. a partially stowed/deployed position).

According to an embodiment, the closure panel 106 may be manually opened/closed by a force applied from movement of a user's hand. According to an embodiment, movement of the closure panel 106 may trip a detector 118 in the form of a sensor, contact or the like, electrically connected or otherwise (FIG. 3), to cause the motor 110 to move the lifting mechanism 108 and bottom panel 102. If desired, the detector 118 may determine when the housing door 106 is moved to a fully opened position to initiate movement of the lifting mechanism 108 and tray bottom panel 102 by the motor 110; as such, if a relatively large item, such as, for example, a large purse, P, is positioned on the tray 102, the fully-opened positioning of the housing door 106 would not interfere with the upward movement of the purse, P, as the bottom panel 102 and purse, P, are moved from a stowed to a deployed position.

While the foregoing example describes a specific arrangement of a closure panel and a bottom panel 102, it will be appreciated that the disclosure hereof further contemplates any deployment and stowage of any accessory receiving body in response to a position of the closure panel 106 in relation to a detector 118.

According to an embodiment, movement of the closure panel 106 may be independent of the movement of the bottom panel 102 and lifting mechanism 108 (i.e. the closure panel 106 is not mechanically or electrically coupled to the lifting mechanism 108). If desired, a "disable mode" may be set, for example, by pressing a button 18 so that the bottom panel 102 is not responsive to manual or automatic movement of the housing door 106.

According to an embodiment, movement of the closure panel 106 may be provided by a gear assembly, having, for example toothed, arcuate portions 120 extending from the closure panel that respectively mesh with cooperating toothed disks 122. Accordingly, if manual movement to one of the closure panels 106 is conducted by a user's hand, the toothed arcuate portions 120 and disks 122 causes a similar movement to the other one of the housing door 106. Conversely, the motor 110 may drive one of the disks 122 to effect movement of the closure panel 106 relative the movement of the toothed, arcuate portions 120 relative the disks 122.

Figure 8A:
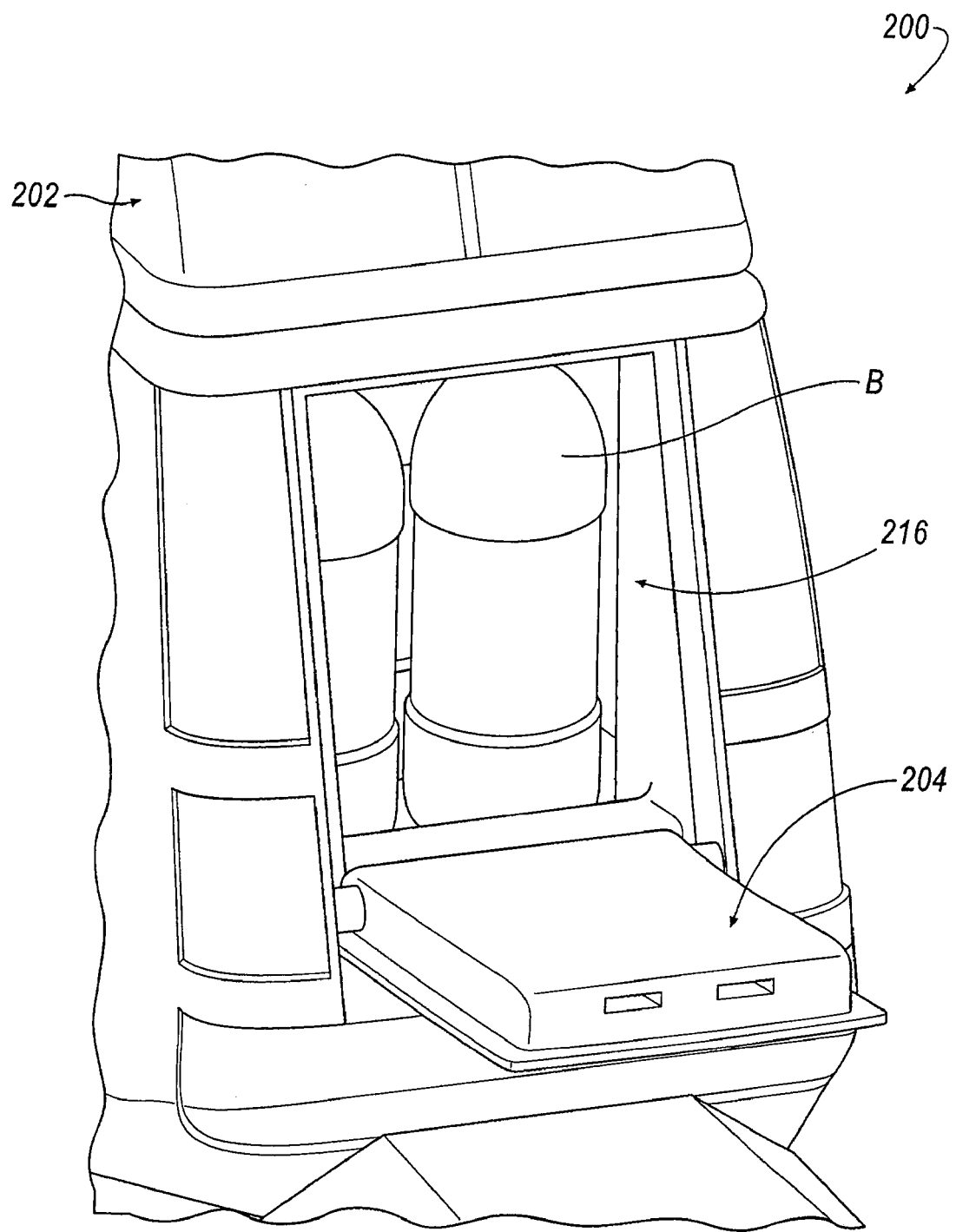
FIG. 8A is a side perspective view of the accessory receiving body of FIG. 6 according to an embodiment of the invention.
Figure 8B:
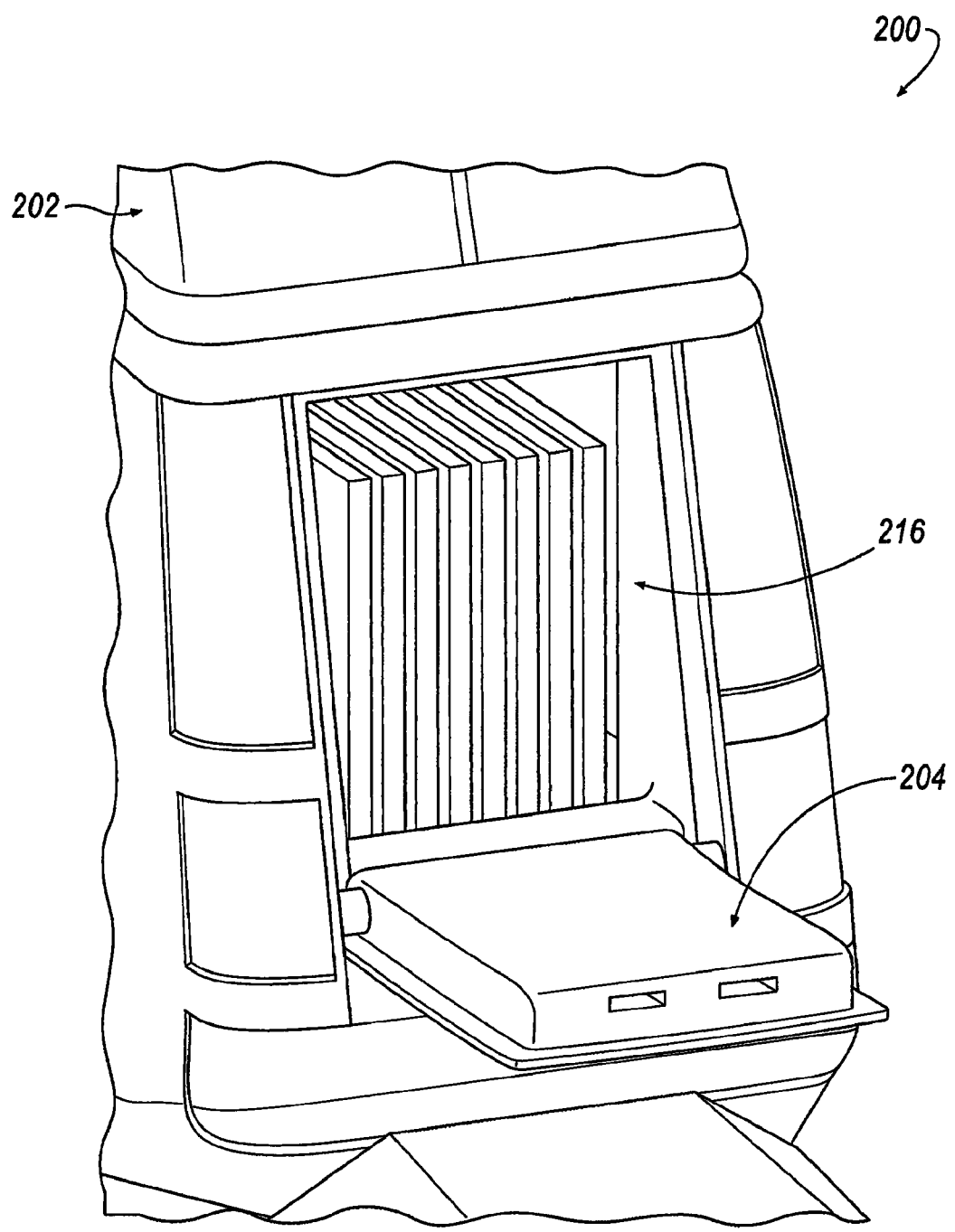
FIG. 8B is a side perspective view of the accessory receiving body of FIG. 7B according to an embodiment of the invention.
Figure 9A:
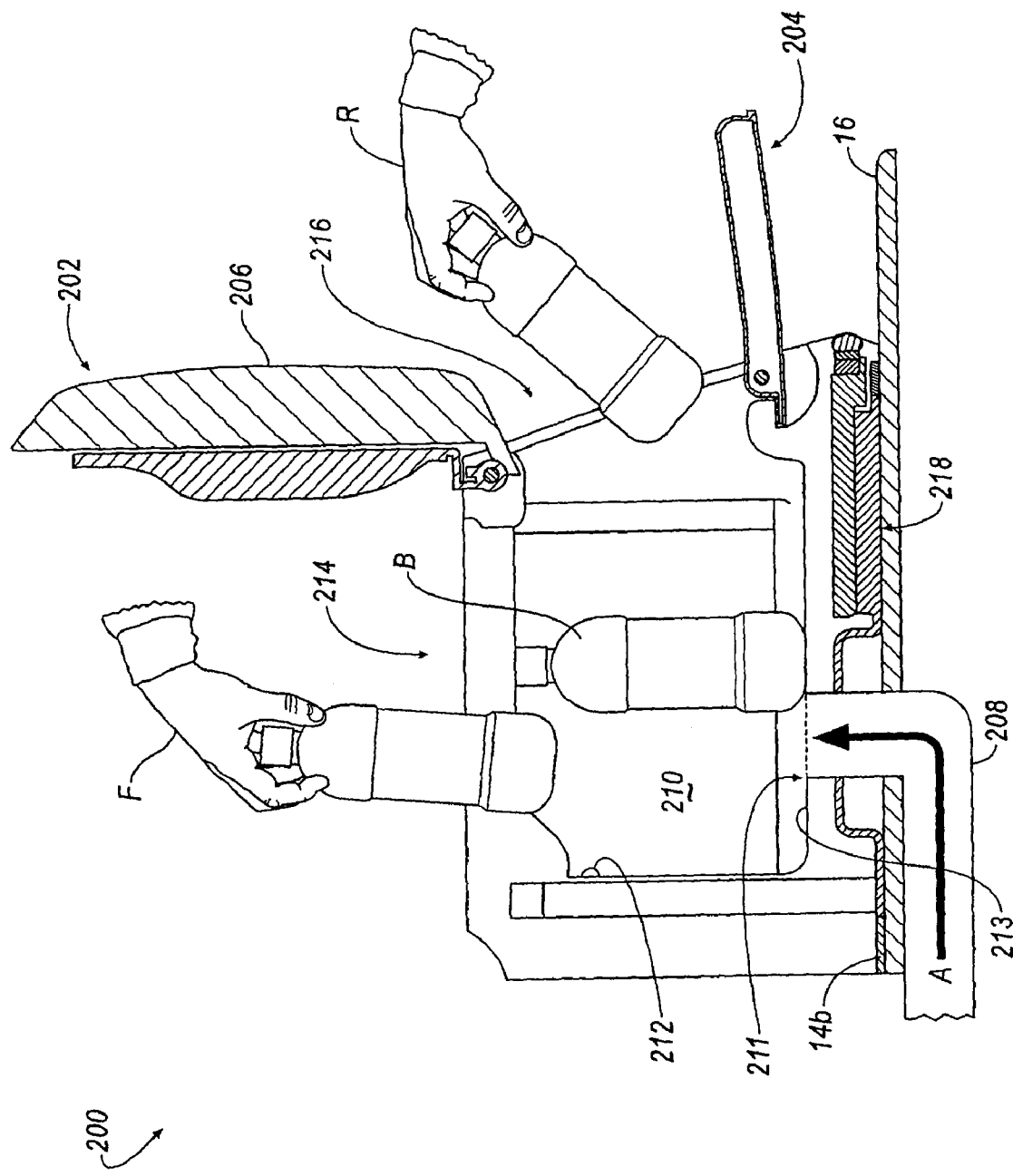
FIG. 9A is a cross-section view of the accessory receiving body of FIGS. 7 and 8 according to line 9A-9A of FIG. 7A.
Figure 9B:
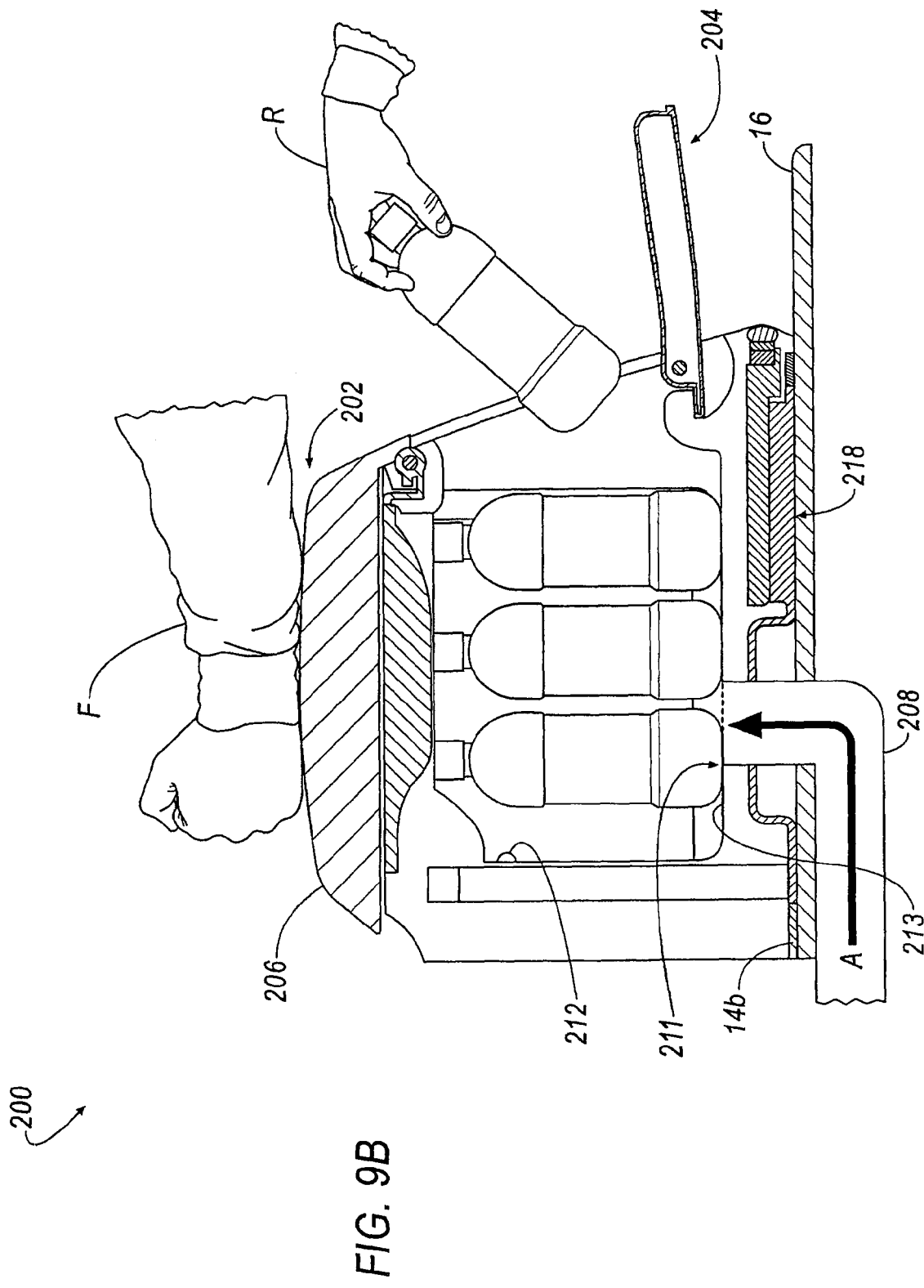
FIG. 9B is another cross-section view of the accessory receiving body of FIGS. 7 and 8 according to an embodiment of the invention.
Figure 10:
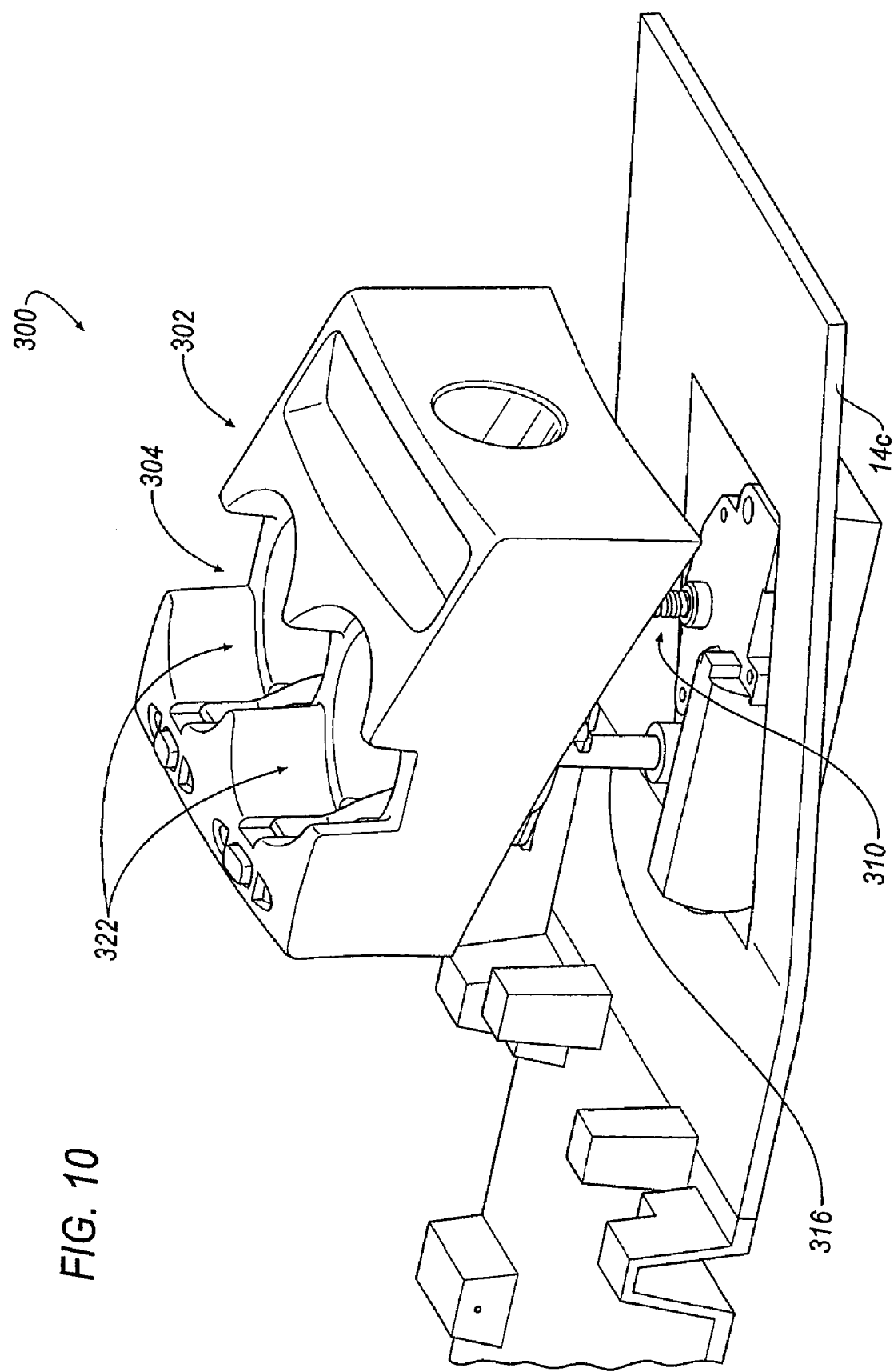
FIG. 10 is a perspective view of an accessory receiving body of the console of FIG. 1 according to an embodiment of the invention.
Figure 11:
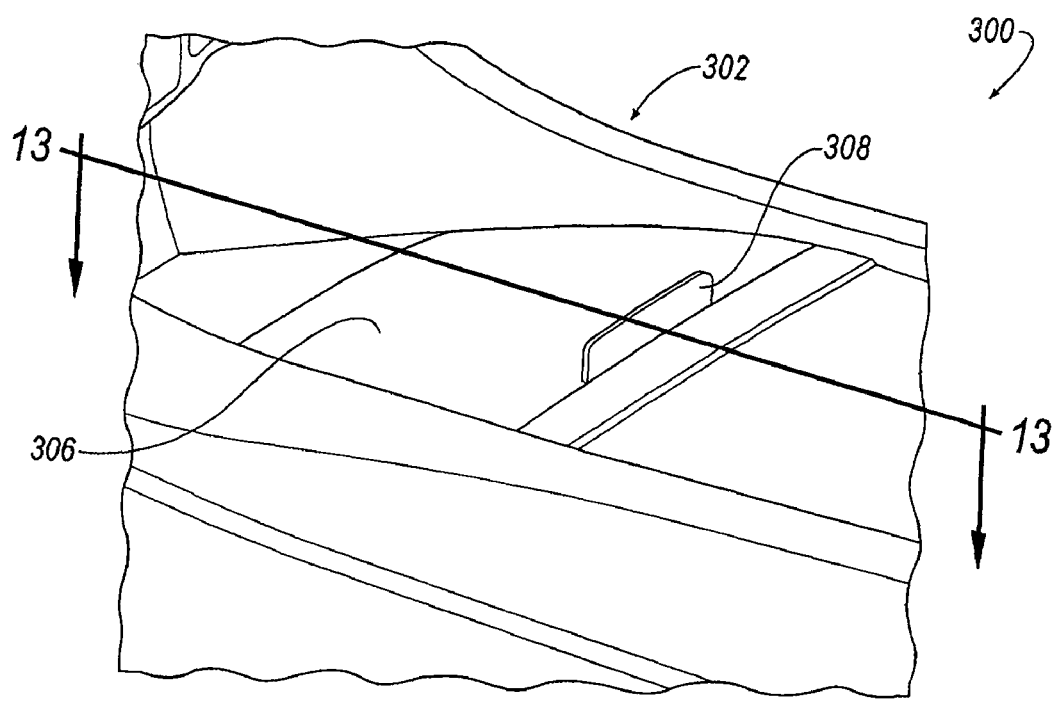
FIG. 11 is a perspective view of the accessory receiving body of FIG. 10 according to an embodiment of the invention.

Referring to FIGS. 6-9B, the accessory receiving body 200 includes a first, top access panel 202 and a second, side access panel 204. According to an exemplary arrangement, the accessory receiving body 200 may reside between a pair of vehicle seats (not shown), such as, for example, front/forward seats. A rear/rearward row of seats (not shown) may face the side access panel 204. As such, referring to FIG. 9A, the first, top access panel 202 may permit users, F, located in front/forward seats to access items, B, in the accessory receiving body 200 through a first opening 214 when the top access panel 202 is in the open position, and, the second, side access panel 204 may permit users, R, located in the rear/rearward seats to access the items, B, through a second opening 216 in the accessory receiving body 200. Accordingly, access to the items, B, through the second opening 216 prevents the disturbance of front/forward seating occupants, F, that may utilize a cushioned top surface 206 of the top access panel 202 as an armrest when the top access panel 202 is in a closed position (FIG. 9B).

With reference to FIGS. 6, 7, 9A and 9B, the top access panel 202 is hingably attached to a rearward portion of accessory receiving body 200, and with reference to FIGS. 6, 8, 9A and 9B, the side access panel 204 is hingably attached to a bottom portion of accessory receiving body 200. Upon considering the present disclosure, it will be appreciated that the top access panel 202 and side access panel may be hingably attached in any known way and the invention should not be limited to the exemplary attachment. Further, it will also be understood that the invention disclosed herein contemplates that the panels 202, 204 may be attached in other known ways, including, for example slidable attachment.

According to an embodiment, the accessory receiving body 200 may function as a refrigerator for maintaining items, such as, for example, beverage containers, B. According to an embodiment, an air duct 208 may provide a passage for cold air, A, from an air conditioning system to the accessory receiving body 200. Alternatively, an interior of the accessory receiving body 200 may include a cooling element 210, such as, for example, a refrigerator (which may include, e.g., a compressor, heat-exchange pipes, expansion valve, and refrigerant), re-freezable cold packs that are insertable into a sleeve within the accessory receiving body 200 or the like.

If desired, a tray 211 or the like may be placed over a bottom wall 213 of the accessory receiving body 200 for retaining ice cubes. According to an embodiment, element 208, which was previously described as an air duct, may be a drain for the purpose of permitting the evacuation of liquid, such as, for example, water from melting ice cubes, spilled beverage liquid from the beverage containers, B, or the like.

If desired, the accessory receiving body 200 may include a temperature sensor 212 that communicates with a controller (not shown) for activating the cooling system, such as, for example, a cooling element 210 or air conditioning system for drawing cool air, A, into the accessory receiving body 200 upon detecting that the temperature condition of the accessory receiving body 200 has risen to a temperature condition higher than a programmed temperature condition. According to an embodiment, actuation of the cooling system 210 may be responsive to a periodic detection of the temperature of a cavity defined by the interior walls of the accessory receiving body 200, by, for example, the temperature sensor 212 according to a timer/counter that communicates with a controller. According to an embodiment, the opening and closing of one of or both the access panels 202, 204 may cause the activation of the cooling system 210 by providing a detector (not shown) in a predetermined position as previously described. According to an embodiment, the cooling system 210 may be deactivated if the temperature of the accessory receiving body 200 is maintained at a programmed temperature condition.

Figure 7B:
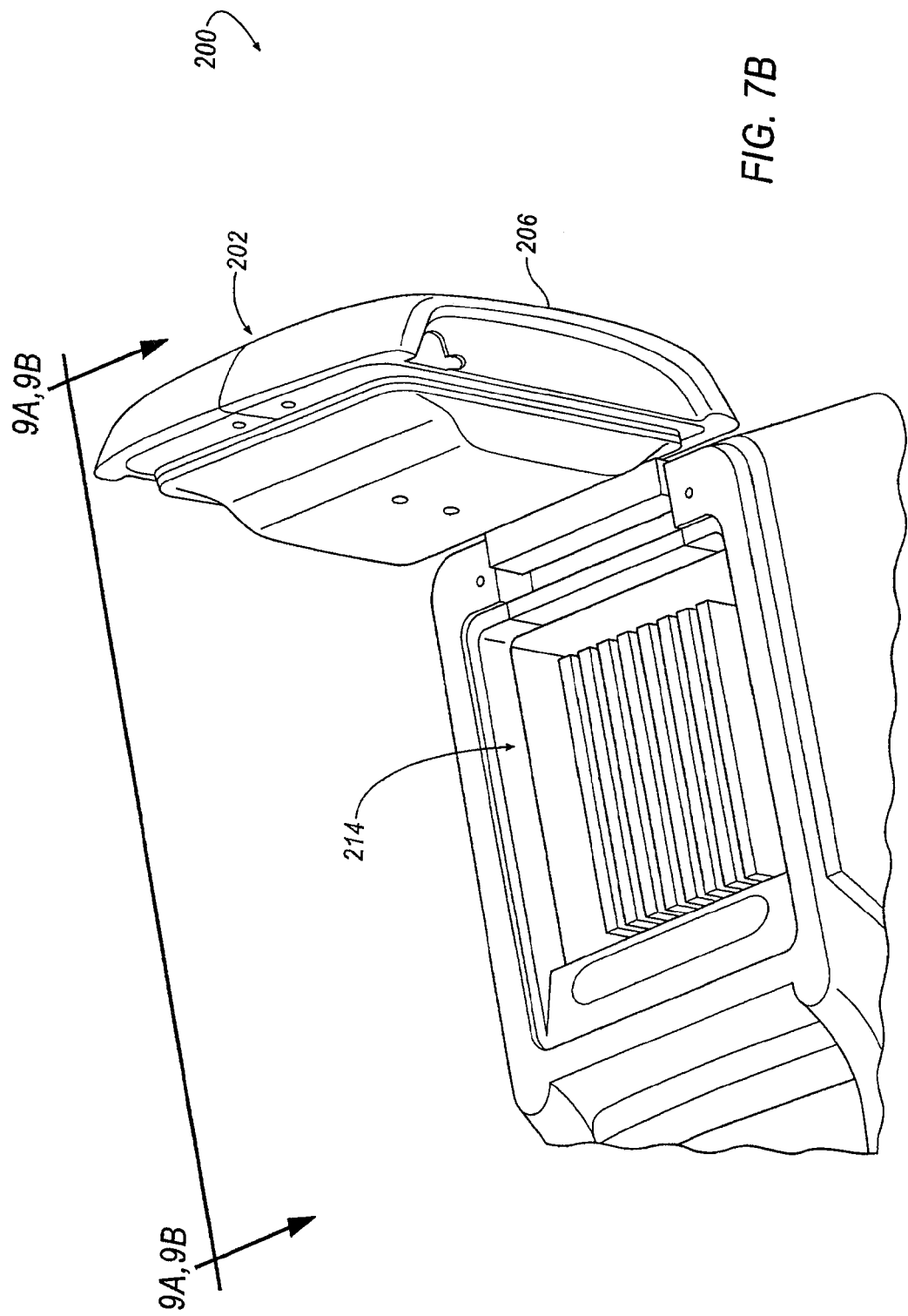
FIG. 7B is a top perspective view of an accessory receiving body according to an embodiment of the invention.

According to an embodiment, the accessory receiving body 200 may function as a storage compartment for user items, including but not limited to, CD's, DVD's or the like (See FIG. 7B, 8B). While two uses for accessory receiving body 200 are herein described, upon considering the present disclosure, accessory receiving body 200 may be adapted to receive a variety of accessories.

If desired, the top and/or side access panel 202, 204 may include a control system 215 that are operable by, for example, the occupants, F, R, respectively. The control system 215 may include, for example, heating/ventilation/air-conditioning (HVAC) controls, entertainment controls (e.g., radio, television, video games), or refrigeration controls for adjusting the temperature of the accessory receiving body 200. In an electronic control system 215, the control system 215 may transmit instructions or data associated with an electronic control to one or more controllers. If desired, a secondary storage compartment 218 may be located, for example, proximate the side access panel 204. For example, the secondary storage compartment 218 may be a beverage cradle slidably disposed within a bottom portion of the accessory receiving body 200.

Referring to FIGS. 10-14, the accessory receiving body 300 is a beverage receptacle including a base 302 that defines one or more beverage receiving portions 304, and a lifting mechanism 310. A door/lid 306 may optionally be provided 312 to store or otherwise close out the base 302 and the beverage receiving portion 304 such that the accessory receiving body 300 may be fully stowed within the console 100.

With continued reference to FIGS. 10-14, independent of the door, however, the beverage receiving portion 304 is adjustable between a first, fully retracted position and a second, fully extended position, and may be infinitely adjusted to every position therebetween for presentment and use. As such, the beverage receiving portion 304 may be accessed and used at any of the foregoing positions, including the fully retracted position. For example, if the door 306 is provided, the door 306 may be opened to allow use of the beverage receptacle 300 in the fully retracted position.

According to an embodiment, a motor 318 is provided to operably, vertically deploy or vertically adjust the position of base 302 to any of the foregoing positions. For example, the lifting mechanism 310 can include the motor 318 operably connected to a ball screw 312 relative to a bearing 314. Actuation of the motor 310 causes rotation of a ball screw 312 relative to the bearing 314 to effect vertical movement of the base 302 to/from a stowed/presentment position. If desired, a post 316 may extend from the base portion 14c to provide additional stability to the base 302. According to an embodiment, the ball screw 312 and post 316 may enlist the packaging of the base 302. Specifically, the definition of two beverage receiving portions 322 creates a space therebetween which can be adapted to vertically mount one or both of the ball screw 312 and post 316 thereon.

According to the foregoing description, the condition of the base 302 (to any of the positions) may be changed responsive to, for example, movement of the lid 306. For example, movement of lid 306 from a closed state to an open state may change (or any actuator 18) the condition of the base 302 from the fully retracted position to the presentment position (which may be, e.g., the fully extended position).

According to an embodiment, the condition of the base 302 may be changed in response to a detector 324, such as a sensor in the form of an electrical contact or the like, that detects the presence of the lid 306 in a predetermined position (e.g., in an open position, a portion of the closure panel may contact the detector 324) to operably present the base portion 302. While an electrical contact is described, it is understood that other sensing means might be replaced therefore. Among other examples, a photodiode or the like may be provided to detect the presence of a condition. Similarly, the sensor 324 may operably retract the base portion 302 upon detection of a closing action on the lid 306.

According to an embodiment, the lid 306 is slidably disposed over the base portion 302 and maybe opened/closed manually by a force applied by a user's hand proximate a lip 308 or the like. According to an embodiment, the opening/closing movement of the slidable lid 306 may trip a detector 324 to cause automatic movement of the lifting mechanism 310 by the motor 318. As illustrated, an end 326 of the slidable lid 306, may, for example, contact the detector 324 so as to provide clearance for movement of the base 302 from a fully retracted to a presentment position.

Figure 12:
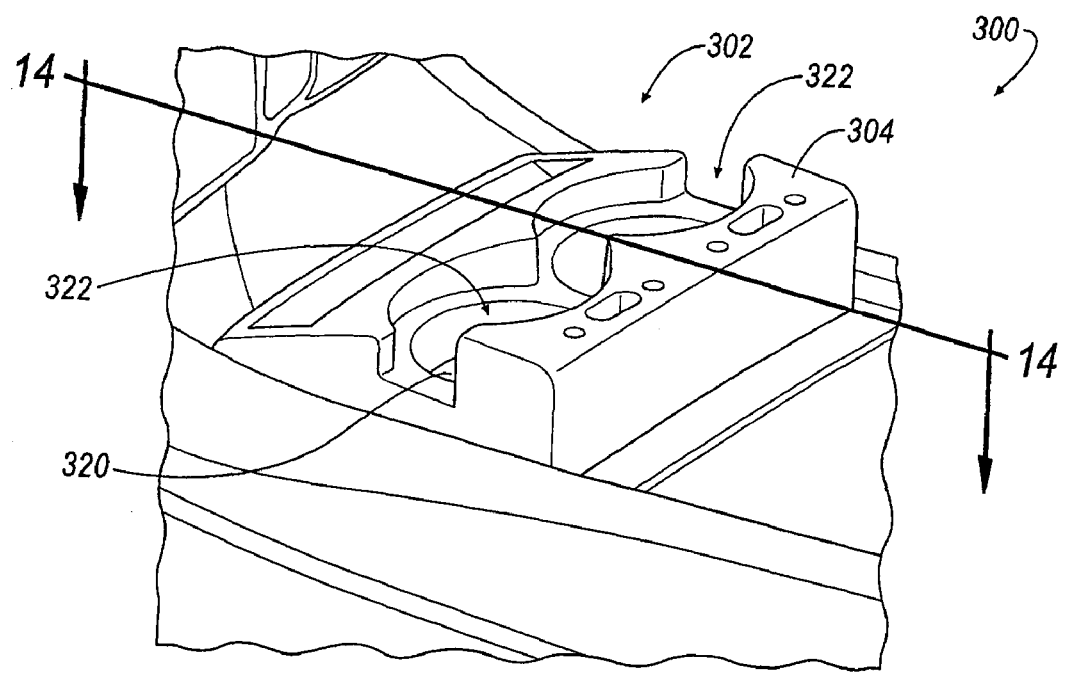
FIG. 12 is another perspective view of the accessory receiving body of FIG. 10 according to an embodiment of the invention.
Figure 13:
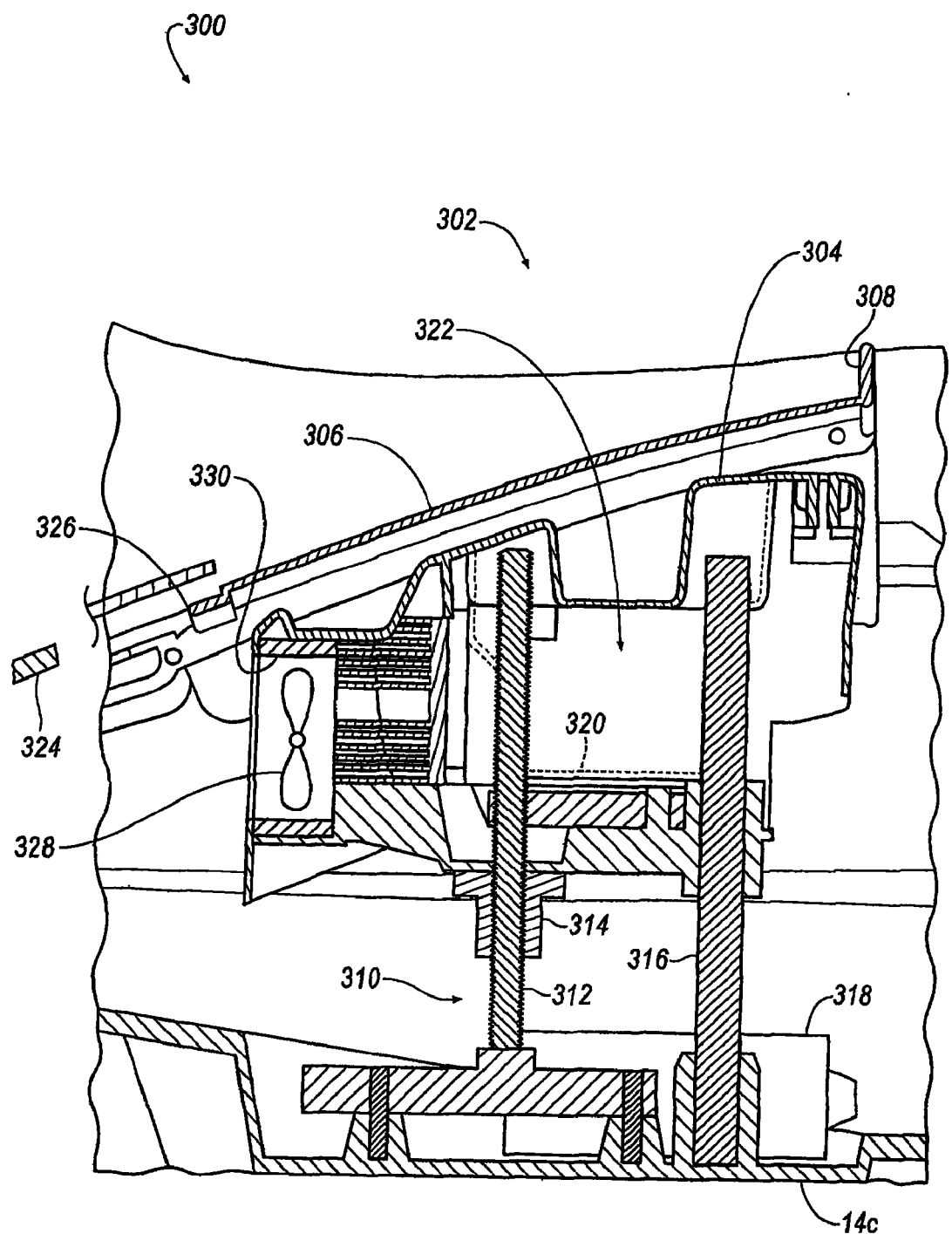
FIG. 13 is a cross-section view of the accessory receiving body of FIG. 11 according to line 13-13.
Figure 14:
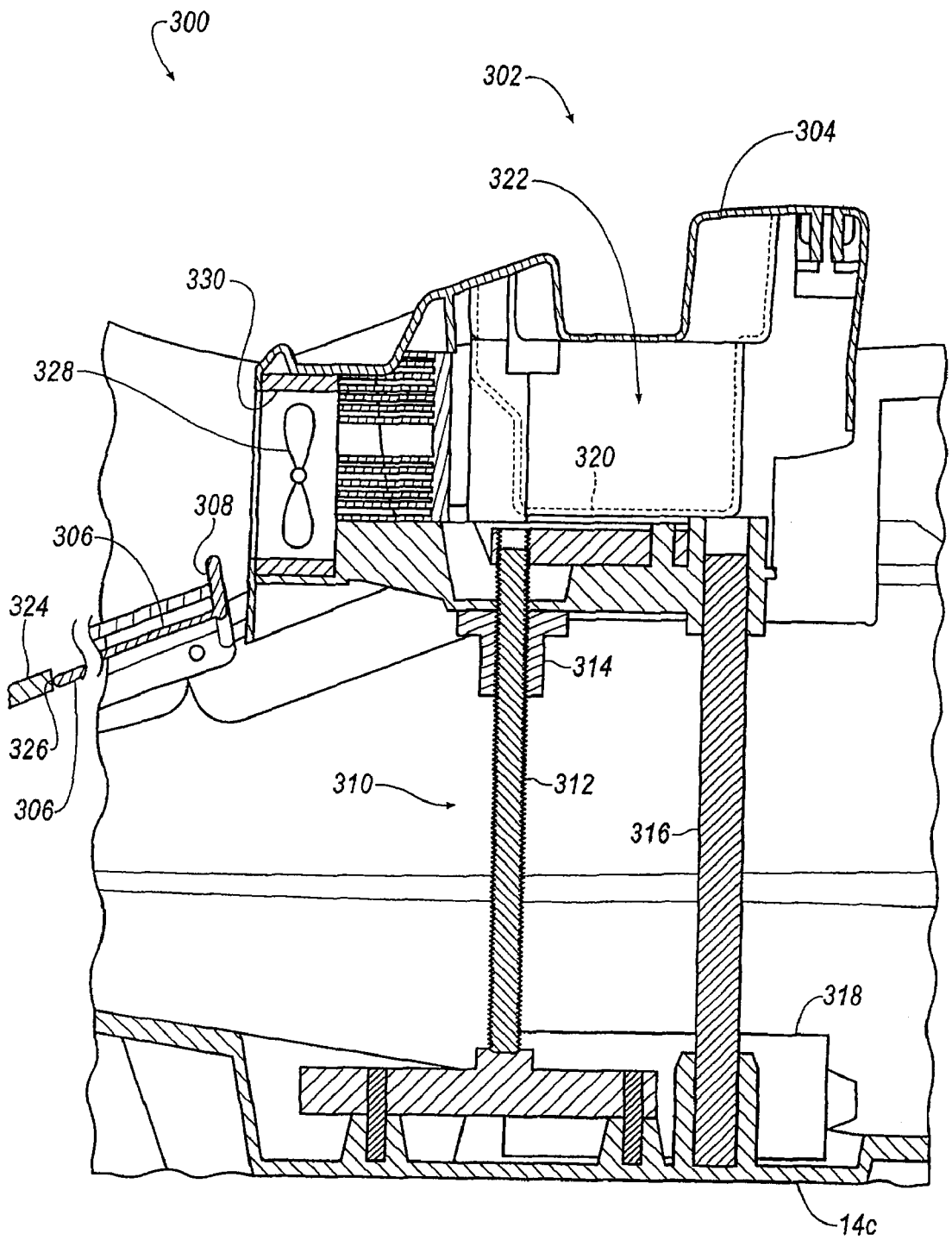
FIG. 14 is a cross-section view of the accessory receiving body of FIG. 12 according to line 14-14.

If desired, movement of the lifting mechanism 310 may occur when the slidable lid 306 is moved from a closed position (FIGS. 11, 13) to a fully opened position (FIGS. 12, 14). The fully opened position of the slidable lid 306 maybe determined by the detector 324 or the like. As such, upon moving the slidable lid 306 to an open position, the base portion 302 may be moved from the fully retracted position to a presentment position such that the base portion 302 may be presented to a user until/as the slidable lid 306 is opened.

In an embodiment the accessory receiving body 300 may include a heating/cooling device 328 for heating/cooling a beverage container, B. While a heating/cooling device 328 is disclosed, the present invention should not be limited thereby. The heating/cooling device 328 may include, for example, a fan located in an air duct 330 of a vehicle's HVAC system. An embodiment of the accessory receiving body 300 may include a memory for programming an intermediate position of the tray 304 (i.e. a partially deployed position of the tray 304) relative a position of any one of a plurality of unique vehicle occupant settings that may or may not be associated with, for example, unique vehicle occupant settings related to vehicle seats, operator pedals, mirrors, radio station setting, or the like.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A console for a vehicle comprising:
   a closure panel;
   an actuator operably connected to the closure panel, whereupon engagement between the closure panel with the actuator instructs a vehicle accessory to move from a first position to at least one second position,
   a motor connected to the actuator; and
   a lifting mechanism connected to the motor and the vehicle accessory, wherein movement of the lifting mechanism is responsive to the actuation of the motor, wherein the actuator is a contact sensor that causes the motor to drive the lifting mechanism to cause movement of the vehicle accessory from the first position to the at least one second position.

2. The console according to claim 1, wherein the lifting mechanism is defined by a scissor bridge and a ball screw.

3. The console according to claim 1, wherein the lifting mechanism is defined by a ball screw, bearing, and a stability post.

4. The console according to claim 1 further comprising
   a body defined by a floor and sidewalls extending axially from said floor, wherein said sidewalls are fixed relative to said floor, wherein the vehicle accessory defines a receiving body that is movably-disposed in the body for movement between said first and second positions and any position therebetween within the body, said receiving body accessible independent of said position thereof within the body.

5. The console according to claim 4, wherein the receiving body further comprises
a sidewall defining a depth; and one or more partitioning elements defining two or more stowage segments.

6. The console according to claim 1, wherein the vehicle accessory further comprises
a heating/cooling device; and
one or more beverage container receiving portions in thermal communication with the heating/cooling device.

7. A console for a vehicle comprising:
an accessory receiving body adjustable between a first position, a second position, and any position therebetween, said accessory receiving body accessible independent of said position thereof;
an actuator for causing movement of the accessory receiving body between said first position, second position, and any position therebetween;
a motor connected to the actuator; and
a lifting mechanism connected to the motor and the accessory receiving body, wherein movement of the lifting mechanism is responsive to the actuation of the motor.

8. The console according to claim 7, wherein the actuator is a presence/weight sensor that detects the presence or weight of an object.

9. The console according to claim 7 further comprising
a closure panel, wherein the actuator is operably connected to the closure panel, whereupon engagement between the closure panel with the actuator instructs the accessory receiving body to move from said first position to said second position, and said any position therebetween.

10. The console according to claim 9 wherein the actuator is a contact sensor that causes the motor to drive the lifting mechanism to cause movement of the accessory receiving body from said first position to said second position, and said any position therebetween.

11. The console according to claim 10, wherein the lifting mechanism is defined by a scissor bridge and a ball screw.

12. The console according to claim 10, wherein the lifting mechanism is defined by a ball screw, bearing, and a stability post.

13. The console according to claim 7 further comprising
a body defined by a floor and sidewalls extending axially from said floor, wherein said sidewalls are fixed relative to said floor, wherein the accessory receiving body is movably-disposed in the body, wherein the accessory receiving body is adjustable between said first position to said second position, and said any position therebetween within the body, said accessory receiving body is accessible independent of said position thereof within the body.

14. The console according to claim 7, wherein the accessory receiving body further comprises
a sidewall defining a depth; and
one or more partitioning elements defining two or more stowage segments.

15. The console according to claim 7, wherein the accessory receiving body further comprises
a heating/cooling device; and
one or more beverage container receiving portions in thermal communication with the heating/cooling device.

16. A console for a vehicle comprising:
a body defining an interior space and first and second openings to provide access into said interior space;
a first panel for providing selective access to said interior space via said first opening;
a second panel for providing selective access to said interior space via said second opening;
an actuator for causing movement of the body between a first position a second position, and any position therebetween;
a motor connected to the actuator; and
a lifting mechanism connected to the motor and the body wherein movement of the lifting mechanism is responsive to the actuation of the motor.

17. The console according to claim 16, wherein the first panel and said first opening are positioned at a top of said body, and wherein the second panel and said second opening are positioned on a side of said body, and further wherein said second panel includes a control system interface.

18. The console according to claim 17, wherein the interior space is a stowage cavity, and wherein the first opening provides access to the stowage cavity by moving said first panel from a closed position to an open position, and further wherein the second opening provides access to the stowage cavity by moving said second panel from a closed position to an open position, and wherein the first panel defines a cushioned surface and one side thereof to provide an armrest when the first panel is moved to the closed position, wherein, when the first panel is moved from the closed position to the open position, access to the stowage cavity through the first opening is provided to front seat passengers, wherein movement of the second panel from the closed position to the open position provides access to the stowage cavity through the second opening for rear seat passengers.

19. The console according to claim 18, wherein the stowage cavity further comprises
a tray for receiving one or more beverage containers;
a temperature sensor; and
a heating/cooling system connected to the temperature sensor for adjusting the temperature of the stowage cavity.

20. The console according to claim 16, wherein the actuator is a presence/weight sensor that detects the presence or weight of an object.

21. The console according to claim 16, wherein one of said first or second panels is operably connected to the actuator, whereupon engagement between one of said first or second panels with the actuator instructs the body to move from a first position to at least one second position.

22. The console according to claim 21 wherein the actuator is a contact sensor that causes the motor to drive the lifting mechanism to cause movement of the body from said first position to said second position, and said any position therebetween.

23. The console according to claim 16, wherein the lifting mechanism is defined by a scissor bridge and a ball screw.

24. The console according to claim 22 further comprising
an outer body defined by a floor and sidewalls extending axially from said floor, wherein said sidewalls are fixed relative to said floor, wherein the body is movably-disposed in the outer body, wherein the body is adjustable between said first position to said second position, and said any position therebetween within the outer body, said body is accessible independent of said position thereof within the outer body.

25. The console according to claim 16, wherein the body further comprises
a sidewall defining a depth; and
one or more partitioning elements defining two or more stowage segments.

26. A console for a vehicle having a floor, said console comprising:

a body defined by a floor and sidewalls extending axially from said floor, wherein said sidewalls are fixed relative to said floor;

an accessory receiving body disposed in the body, wherein the accessory receiving body is adjustable between a first position, a second position, and any position therebetween within the body, said accessory receiving body accessible independent of said position thereof within the body;

an actuator for causing movement of the accessory receiving body between said first position, said second position, and said any position therebetween;

a motor connected to the actuator; and a lifting mechanism connected to the motor and the accessory receiving body, wherein movement of the lifting mechanism is responsive to the actuation of the motor.

27. The console according to claim 26, wherein the actuator is a presence/weight sensor that detects the presence or weight of an object.

28. The console according to claim 26, wherein one of said first or second panels is operably connected to the actuator, whereupon engagement between one of said first or second panels with the actuator instructs the accessory receiving body to move from a first position to at least one second position.

29. The console according to claim 28 wherein the actuator is a contact sensor that causes the motor to drive the lifting mechanism to cause movement of the accessory receiving body from the first position to the at least one second position.

30. The console according to claim 26, wherein the lifting mechanism is defined by a scissor bridge and a ball screw.

31. The console according to claim 26, wherein the body further comprises a sidewall defining a depth; and one or more partitioning elements defining two or more stowage segments.

* * * * *